United States Patent
Breebaart et al.

(10) Patent No.: US 12,069,464 B2
(45) Date of Patent: Aug. 20, 2024

(54) PRESENTATION INDEPENDENT MASTERING OF AUDIO CONTENT

(71) Applicants: DOLBY LABORATORIES LICENSING CORPORATION, San Francisco, CA (US); DOLBY INTERNATIONAL AB, Amsterdam Zuidoost (NL)

(72) Inventors: Dirk Jeroen Breebaart, Ultimo (AU); David Matthew Cooper, Carlton (AU); Giulio Cengarle, Barcelona (ES); Brett G. Crockett, Brisbane, CA (US); Rhonda J. Wilson, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 404 days.

(21) Appl. No.: 17/625,720

(22) PCT Filed: Jul. 7, 2020

(86) PCT No.: PCT/US2020/041064
§ 371 (c)(1),
(2) Date: Jan. 7, 2022

(87) PCT Pub. No.: WO2021/007246
PCT Pub. Date: Jan. 14, 2021

(65) Prior Publication Data
US 2022/0295207 A1 Sep. 15, 2022

Related U.S. Application Data

(60) Provisional application No. 62/911,844, filed on Oct. 7, 2019.

(30) Foreign Application Priority Data
Jul. 9, 2019 (ES) .............................. ES201930637

(51) Int. Cl.
*H04S 3/00* (2006.01)
*H04R 5/04* (2006.01)
*H04S 7/00* (2006.01)

(52) U.S. Cl.
CPC ............... *H04S 3/008* (2013.01); *H04R 5/04* (2013.01); *H04S 7/301* (2013.01); *H04S 2400/01* (2013.01); *H04S 2420/03* (2013.01)

(58) Field of Classification Search
CPC ...... H04S 3/008; H04S 7/301; H04S 2400/01; H04S 2420/03; H04R 5/04
(Continued)

(56) References Cited

U.S. PATENT DOCUMENTS 9,026,450 B2 5/2015 Dressler
9,179,236 B2 11/2015 Robinson
(Continued)

FOREIGN PATENT DOCUMENTS

CN 109478400 A 3/2019
CN 109887521 A 6/2019
(Continued)

OTHER PUBLICATIONS

Katz, Bob "Mastering Audio" Taylor & Francis Ltd. Oct. 2014.

*Primary Examiner* — George C Monikang (57) ABSTRACT

A method for generating mastered audio content, the method comprising obtaining an input audio content comprising a number, M1, of audio signals, obtaining rendered presentation of the input audio content, the rendered presentation comprising a number, M2, of audio signals, obtaining a mastered presentation generated by mastering the rendered presentation, comparing the mastered presentation with the rendered presentation to determine one or more indications of differences between the mastered presentation and the rendered presentation, modifying one or more of the audio (Continued)

signals of the input audio content based on the indications of differences to generate the mastered audio content. With this approach, conventional, typically stereo, channel-based mastering tools can be used to provide a mastered version of any input audio content, including object-based immersive audio content.

20 Claims, 6 Drawing Sheets

(58) Field of Classification Search
USPC .......................................... 381/17–19, 22–23
See application file for complete search history.

(56) References Cited

U.S. PATENT DOCUMENTS

| | | |
|---|---|---|
| 9,479,886 B2 | 10/2016 | Xiang |
| 9,654,869 B2 | 5/2017 | Reiss |
| 9,934,790 B2 | 4/2018 | Baumgarte |
| 2008/0019534 A1 | 1/2008 | Reichelt |
| 2011/0166867 A1 | 7/2011 | Seo |
| 2014/0226823 A1 | 8/2014 | Sen |
| 2016/0066118 A1 | 3/2016 | Oh |
| 2019/0215540 A1 | 7/2019 | Nicol |
| 2021/0312937 A1 | 10/2021 | Cengarle |

FOREIGN PATENT DOCUMENTS

| | | |
|---|---|---|
| WO | 2014160849 W | 10/2014 |
| WO | 2014209902 A1 | 12/2014 |
| WO | 2015035492 A1 | 3/2015 |
| WO | 2016126907 A1 | 8/2016 |
| WO | 2017023423 W | 2/2017 |

PRESENTATION INDEPENDENT MASTERING OF AUDIO CONTENT

CROSS-REFERENCE TO RELATED APPLICATIONS

This application claims the benefit of priority to Spanish Application No. P201930637 filed 9 Jul. 2019; and U.S. Provisional Patent Application No. 62/911,844 filed 7 Oct. 2019, the contents of which are hereby incorporated by reference.

FIELD OF THE INVENTION

This invention relates to mastering of multi-channel, immersive and/or object-based audio content such as Dolby Atmos, and specifically mastering such content which has not been previously down-mixed and/or rendered into a specific playback presentation (such as stereo, 5.1, etc.).

BACKGROUND OF THE INVENTION

Music production and distribution typically comprises the following stages:
  Composition, recording and/or production of a music track. In this stage, audio assets are captured or generated, and a composition is created or refined.
  Mixing: in this stage, levels, timbre, and effects are adjusted to create an aesthetically pleasing mix with all instruments and effects properly balanced. This process provides access to individual recordings, tracks, instruments and stems (if any) which can then be modified individually or as subgroups.
  Mastering: in this stage, a mix down of the mixed content is modified for changes in overall timbre, loudness, and dynamics. These attributes are modified to improve the overall mix (in isolation), to improve consistency of levels and timbre across tracks for an album, to make the recording suitable for a specific distribution medium (lossy codec, vinyl, CD) and the like.

The mastering stage is traditionally performed on a channel-based presentation of the mix, for example a stereo or 5.1 rendition or downmix of the mix. Furthermore, typical processors employed in the mastering process include equalizers, (multi-band) compressors, peak limiters, and/or non-linear processes such as emulation of tape or tube saturation, peak limiting and/or clipping and the like. These processors may be implemented as digital processes running in a digital audio workstation (DAW) or on dedicated hardware. They may alternatively, or in addition to, be implemented as analogue hardware.

The mastering process is traditionally undertaken by mastering engineers, however more recently automatic mastering tools are being introduced, for example as cloud services.

The traditional mastering process, and the tools involved work on a channel-based presentation of the content (e.g. suited for a specific reproduction layout such as two loudspeakers or headphones). Furthermore, most tools available for the process will only work with a limited number of channels (typically stereo, 5.1, or 7.1).

This conventional workflow and toolset poses challenges for audio content in other formats, e.g. content including a plurality of signals (audio channels and/or spatial audio objects) and which has not been down-mixed or rendered into a reduced set of channels. One example of such content is channel-based audio with a large number of channels, which may include height channels. Channel-based audio content that includes such height channels is often referred to as "channel-based immersive audio". Mastering of channel-based audio with a large number of channels is typically applied to a down mix into a limited number of channels (stereo, 5.1, or 7.1).

Object-based immersive audio includes, in addition to conventional audio channels, audio objects which are audio signals associated with (dynamic) spatial location. Object-based immersive audio content is distributed in a form in which a rendering process is performed at the reproduction side during playback. As a result, mastering of that content needs to be performed in an immersive or object-based format (e.g. prior to distribution), for which no or few tools exist today.

Object-based immersive audio content can be rendered into presentations adapted for a large set of different reproduction systems (mono, stereo, 5.1, 7.1, 7.1.2, 5.1.4 loudspeaker setups, soundbars and headphones). Given time and effort constraints, mastering content for each reproduction setup individually is almost impossible, or extremely expensive and time consuming.

Immersive audio (channel or object based) content can consist of over a hundred objects and/or bed channels, and hence a common process to be applied to all of these elements simultaneously is difficult to set up and may cause high CPU load and is therefore highly undesirable and not scalable. This is particularly true if the mastering engineer wishes to use analogue hardware, which must be used in real-time and would typically require processing objects sequentially due to the limited hardware availability and high object or channel counts.

Immersive and/or object-based audio content is becoming increasingly popular for use with target playback systems such as cinematic theaters, home audio systems and headphones. It is therefore desirable to provide a more efficient and flexible approach for mastering immersive audio content. Also, other examples of audio content would benefit of an improved mastering process.

GENERAL DISCLOSURE OF THE INVENTION

A first aspect of the present invention relates to a method for generating mastered audio content, the method comprising obtaining an input audio content comprising a number, M1, of audio signals, obtaining a rendered presentation of the input audio content, the rendered presentation comprising a number, M2, of audio signals, obtaining a mastered presentation generated by mastering the rendered presentation, comparing the mastered presentation with the rendered presentation to determine one or more indications of differences between the mastered presentation and the rendered presentation, modifying one or more of the audio signals of the input audio content based on the indications of differences to generate the mastered audio content.

Benefits of the proposed method compared to prior-art mastering processes include:
  Conventional, typical stereo, channel-based mastering tools can be used in a workflow identical to that which mastering engineers are accustomed, in order to provide a mastered version of any input audio content, including object-based immersive audio content.
  Unlike conventional mastering approaches, which are based on a specific reproduction layout, aspects of the invention allow the creation of a mastered, audio asset that can be rendered to any loudspeaker layout, mobile device or headphones.

The mastering process according to aspects of the invention can be applied to one or a few specific renderings of the content without having to master for every loudspeaker setup independently (i.e., master once, play anywhere).

The mastering process can be fully automatic (e.g. as a cloud service or based on artificial intelligence) or manual (by a mastering engineer).

The rendered presentation, which is a presentation suitable for reproduction (playback) on an audio reproduction system, typically has fewer signals (M1>M2) but may in some situations have the same number of audio signals, or even more audio signals than the input audio content.

The input audio content may be a multi-channel content, such as 5.1 or 7.1. The input audio content may include 3D audio information, e.g. channel-based or object-based immersive audio.

The rendered presentation may be a stereo presentation, a binaural presentation, or any other suitable presentation.

In some embodiments, the indications of differences represent energy levels in time-frequency tiles of the mastered presentation and the rendered presentation, and the modification is designed to equalize energy in each time-frequency tile of the signals of the input audio content.

For example, an energy level $\sigma_{n,b}^2$ of a time-frequency tile of a signal $x_{n,b,c}[k]$ n, where n is a time segment index, b is a frequency band index, c is a channel-index and k is a sample index, may be computed according to:

$$\sigma_{n,b}^2 = \Sigma_c \Sigma_k x_{n,b,c}^2[k].$$

The step of modifying the input audio content can include applying a tile specific gain which represents (a square root of) a ratio between energy levels of the corresponding tile in the mastered presentation and the rendered presentation, respectively.

BRIEF DESCRIPTION OF THE DRAWINGS

The present invention will be described in more detail with reference to the appended drawings, showing currently preferred embodiments of the invention.

FIG. 3b is a block diagram showing a second pass for a multi-stage time-frequency energy matching process using a second analysis filter bank which differs from the first filter bank used in the first stage in FIG. 3a.

DETAILED DESCRIPTION OF EMBODIMENTS OF THE INVENTION

The following description is inclusive of content either partially or fully comprised of channel assets, including stereo channel assets, multi-channel assets (5.1, 7.1) and immersive channel assets (with height channels, such as 5.1.2, 7.1.4, etcetera). Therefore, the expression "input audio content" is intended to cover audio content including a set of M1 signals, such as multi-channel audio, immersive audio with height (sometimes referred to as 3D audio, or channel-based immersive audio), and audio content that contains one or more audio objects (object-based immersive audio). An audio object includes an audio signal associated with a spatial location. Note that M1 may equal one, e.g. in the case where the input audio content includes one single audio object.

The input audio content including M1 signals can be rendered to a presentation with M2 signals. While rendering may often involve generating a presentation with fewer signals (e.g., M2<M1), in some cases it may be desirable for the rendered presentation to have the same number of signals, or even more signals, than the input audio content. One example is an input audio content with only one audio object, which may be rendered into a set of (loudspeaker) channels. Another example is a 2-channel (stereo) presentation which may be up-mixed to a 5.1 or 7.1 presentation, or another presentation that includes height channels. Therefore, rendering may be considered to generally correspond to the application of an M1×M2 matrix of (possibly time-varying) coefficients to the full-mix content, regardless of the relationship between M1 and M2. It is noted that the expression "full-mix" does not imply that the audio content necessarily has been mixed, only that it is intended to be further rendered or down-mixed into a set of fewer signals.

Figure 1:
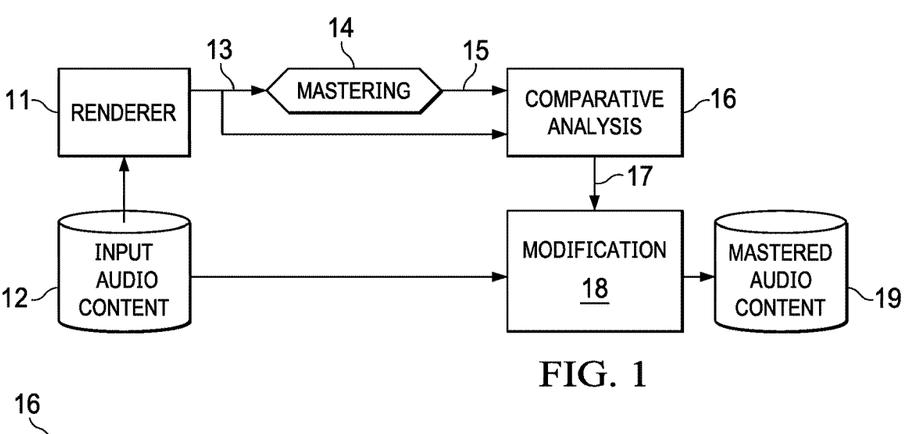
FIG. 1 is a block diagram showing an overview of an embodiment of the invention.

With reference to FIG. 1, an embodiment of the present invention will be described in the following.

First, in renderer 11, an input audio content 12 is rendered for reproduction on one or more reproduction systems, resulting in a rendered presentation 13. As an example, the input audio content may comprise immersive, object-based content, and the rendered presentation may be a stereo presentation intended for loudspeaker playback. When the input audio content includes audio objects, the rendered presentation will include a time-varying rendering of the audio objects.

The rendered presentation 13 is mastered (processed) in a mastering module 14 using mastering tools such as, but not limited to (dynamic) equalizers, (multi-band) compressors, peak limiters, and the like, resulting in a mastered rendered presentation 15. The mastering process enabled by the mastering module 14 can be performed by a mastering engineer, a cloud-based service, using artificial intelligence, or any combination thereof.

A comparative analysis 16 is performed comparing the mastered rendered presentation 15 and the rendered presentation 13 (prior to mastering) so as to quantitatively describe the differences between these two presentations by means of signal or perceptual attributes or parameters 17.

The input audio content 12 is modified in modification block 18 based on the signal or perceptual attributes or parameters 17 to create a mastered audio content 19.

The comparative analysis 16 and modification 18 generates a mastered audio content 19, which, when rendered, sounds similar or identical to the mastered rendered presentation 15 created in the mastering process 14. By using the process outlined in FIG. 1, conventional, channel-based mastering tools can be used to master the audio content that can subsequently be rendered to any reproduction system (e.g. including reproduction layouts that differ from those used in the renderer 11).

Of the elements in FIG. 1, detailed descriptions of the time and frequency processing, and the analysis and modification stages 16, 18 are provided below. Specific details regarding the rendering and mastering elements 11 and 14, respectively, of FIG. 1 are not critical to the nature of the invention, and any suitable rendering and mastering processes may be used. Exemplary rendering methods and systems are described, e.g., in U.S. Pat. Nos. 9,179,236 B2 and 9,204,236 B2, each of which is hereby incorporated by reference in its entirety. Exemplary mastering processes are described, e.g., in "Mastering Audio", Bob Katz, Taylor & Francis Ltd., 2014.

Figure 2:
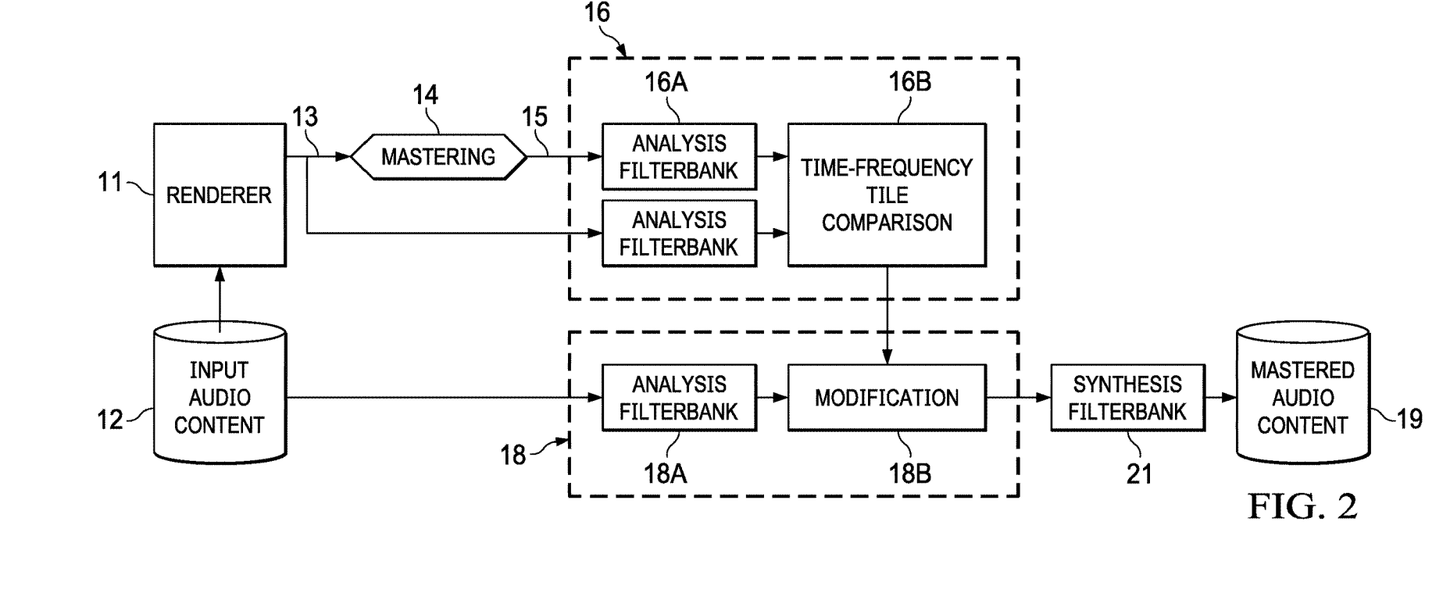
FIG. 2 is a block diagram showing an embodiment of the invention based on analysis and synthesis filter banks.

A more detailed embodiment of the invention is illustrated in FIG. 2, where elements which are similar to those in FIG. 1 have been given corresponding reference numerals.

In FIG. 2, the analysis stage 16 includes two stages 16a and 16b. First, in a tile forming block 16a, both the rendered presentation 13 and the mastered rendered presentation 15 are split into time segments ('frames'). These frames can be partially overlapping in time and can be processed by a window function if desirable. The frames are further divided into frequency bands by an analysis filter bank, one or more band-pass filters, a Fourier transform, or any other suitable method. Sub-bands within frames are referred to as time-frequency tiles. Filterbank structures which are oversampled and/or complex allow for processing of time-frequency tiles without introducing significant amounts of aliasing distortion and are therefore preferred. Examples of such filterbanks are Complex or Hybrid Complex Quadrature Mirror Filter (CQMF or HCQMF) filterbanks and Discrete Fourier Transform (DFT)-based filterbanks, although acceptable results may be achieved using other filterbank structures as well (e.g., including those based on real-valued filters).

Subsequently, in a tile comparison block 16b for each time-frequency tile, an attribute such as an energy, signal level, or loudness value is computed for both presentations.

Then, in the modification block 18, the difference in the attribute in each time-frequency tile is superimposed on each channel/object present in the input audio content 12. In the example in FIG. 2, the input audio content 12 is first divided into time-frequency tiles by time segmentation, time windowing, analysis filter banks or Fourier transforms, indicated by block 18a. This facilitates the time and frequency dependent modification in block 18b, such that the difference in the attribute in each time-frequency tile from tile comparison block 16b is superimposed on each corresponding time-frequency tile of the input audio content 12 from block 18a.

The modified object signals are transformed into a time-domain signal, for example using a synthesis filter bank 21 to produce the mastered audio content 19.

Time-Frequency Tile Energy Matching

In one embodiment, the attribute to analyze and modify is the energy in each sub band. More specifically, the analysis stage compares the energy in each time-frequency tile before and after mastering. Subsequently, the change in energy (as ratio after and before mastering) is superimposed on each object or channel present in the input audio content.

For a band-limited, time-segmented signal $x_{n,b,p,c}[k]$ for segment n, frequency band b, presentation or asset index p, audio channel or object index c, and sample index k, one example of a suitable attribute to compute is the sub-band energy for frame or segment n, $\sigma_{n,b,p}^2$:

$$\sigma_{n,b,p}^2 = \sum_c \sum_k x_{n,b,p,c}^2[k]$$

The presentation or asset index p is given as follows: p=0 refers to the rendered presentation, p=1 refers to the mastered rendered presentation, and p=2 refers to the object-based content. To convey the changes between mastered rendered presentation (p=1) and rendered presentation (p=0) onto the object-based content (p=2), a gain $g_{n,b,c,p=2}$ is applied for each channel c, time frame n, and frequency band b, the squared gain being given by:

$$g_{n,b,c,p=2}^2 = \frac{\sigma_{n,b,p=1}^2}{\sigma_{n,b,p=0}^2}$$

Zone-Dependent Time-Frequency Tile Energy Matching

In one embodiment, the sub-band energy is analyzed independently in different spatial zones such as the front, the rear, the ceiling, the horizontal plane, etc. The energy in each zone is obtained by summing only the energies of the channels in the rendered presentation c(z) that contribute to such zone z:

$$\sigma_{n,b,z,p}^2 = \sum_{c(z)} \sum_k x_{n,b,c(z),p}^2[k]$$

The mapping c(z) of channels to zones can be done manually, or as a function of the channels' canonical positions. The gains are now computed for each zone:

$$g_{n,b,z,p=2}^2 = \frac{\sigma_{n,b,z,p=1}^2}{\sigma_{n,b,z,p=0}^2}$$

When applying time-frequency processing to an object j, a fraction $f_{z,j}$ is computed, representing how much the object's energy contributes to the energy of each zone z. The gain g' to apply to the object is then expressed as a weighted combination of the gains in each zone, and the contribution of the object to each zone:

$$g_{n,b,j}'^2 = \sum_z f_{z,j} \cdot g_{n,b,z,p=2}^2$$

The concept of zone dependent energy matching may be easily understood from a simple example. Consider the case where the mastering process is done on a rendered 5.1 presentation, and the mastering engineer decides to equalize the rear channels (Ls, Rs) differently than the front channels (L,R,C). In that case, the front and rear channels would be analyzed separately, and the time-frequency gains derived from the front channels of the 5.1-rendering would be applied to the objects and channels located in the front half of the room in the immersive content, while the time-frequency gains derived from the rear channels of the 5.1-rendering would be applied to the objects and channels located in the rear half of the room in the immersive content.

The function f(z,j) can be specified by the position metadata (e.g. x,y,z) of the channels and objects in the immersive content. Again looking at the simple front/rear example: under the convention that y=0 is the front and y=1 is the rear of the room, one could say that objects and channels with y>=0.5 receive the gains derived from the rear channels of 5.1, and objects and channels with y<0.5 receive the gains derived from the front channels of 5.1.

Multi-Pass Time-Frequency Energy Tile Matching

Figure 3A:
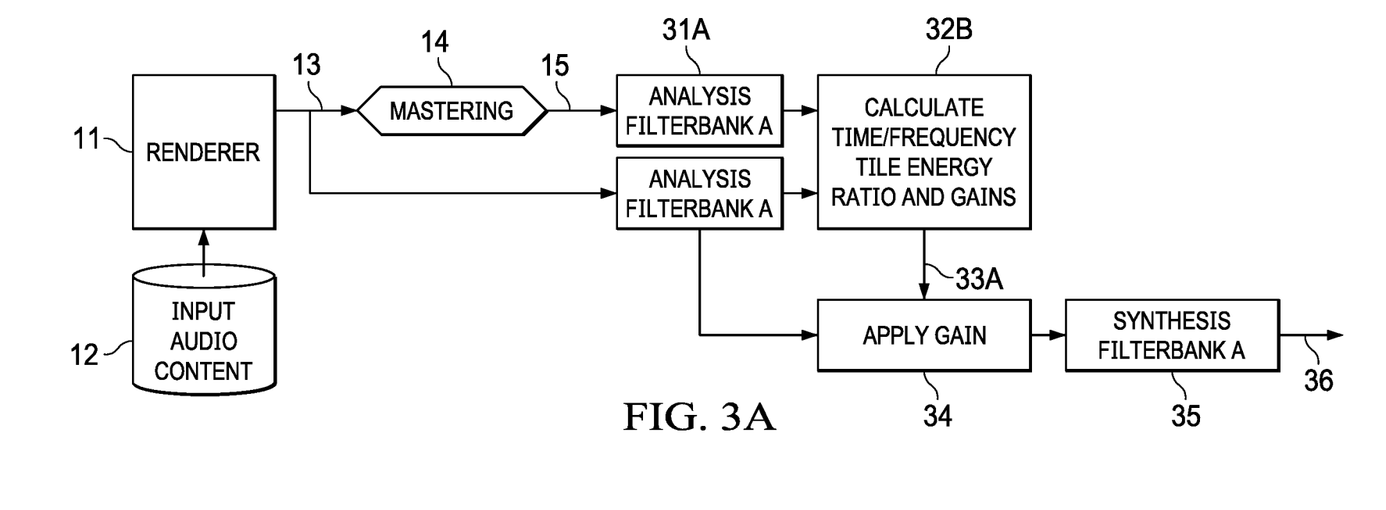
FIG. 3a is a block diagram showing a first pass for a multi-stage time-frequency energy matching process using a first analysis and synthesis filter bank which has a high frequency resolution.
Figure 3B:
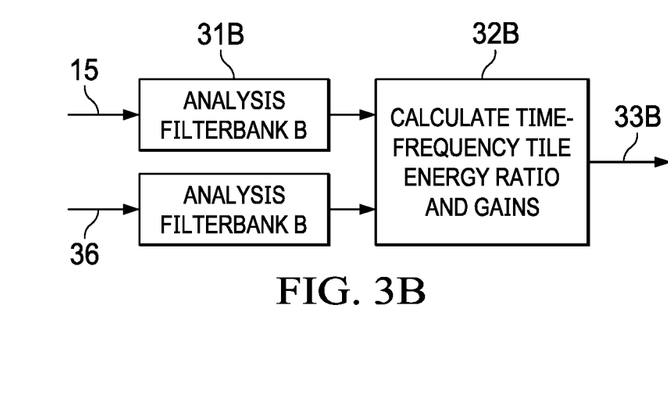
Figure 3C:
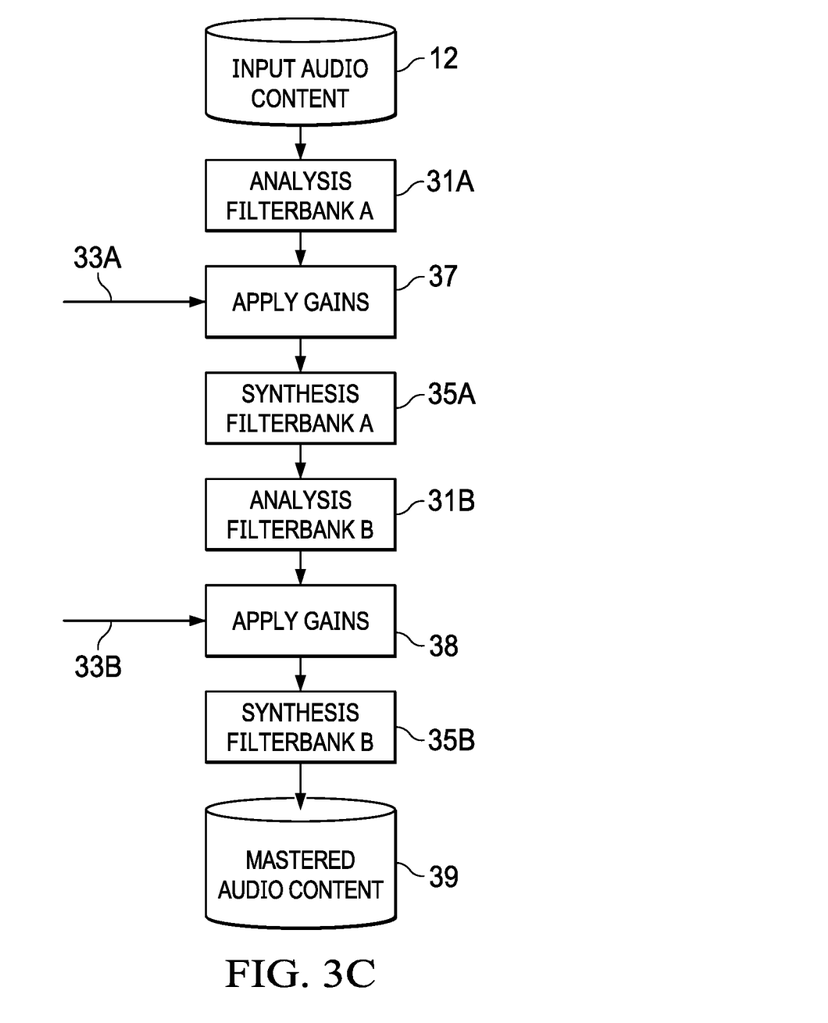
FIG. 3c is a block diagram showing a third pass for a multi-stage time-frequency energy matching process to produce a mastered audio content.

In another embodiment, illustrated in FIGS. 3a-c, a separate set of gains is calculated for two or more different frame sizes. In a first pass, a long frame size is used to ensure that the fine details across frequency of equalization performed during mastering are accurately applied to the object-based presentation. Due to the long frame size, this process will not capture fast-acting dynamic changes, such as those introduced by a fast-acting peak limiter or a fast attack time compressor. Therefore, a second pass that runs on short frames can be beneficial in analyzing, capturing and applying fast-acting changes between the rendered presentation and the mastered rendered presentation.

The first pass is outlined in FIG. 3a. An input audio content 12 is rendered in renderer 11, and subsequently mastered in process 14. The mastered rendered presentation 15 is compared against the rendered presentation 13 by first dividing both presentations in time-frequency tiles by applying a first filter bank A 31a and then calculating the energy ratio in each time-frequency tile in block 32a. The first filer bank A has a first relationship between time and frequency resolution. This process leads to a set of gains 33a that are applied to the rendered presentation 13 in block 34. The output is transformed, for example using a synthesis filter bank 35 corresponding to the filter bank 31a, into a time-domain signal referred to as an intermediate presentation 36. The latter has the slowly acting, but high frequency resolution gain profiles applied which aim to match the rendered presentation to the mastered rendered presentation.

In a second pass, illustrated in FIG. 3b, the mastered rendered presentation 15 is compared against the intermediate presentation 36 in a similar way as in the first pass, albeit with a different filter bank 31b. The second filer bank B has a second relationship between time and frequency resolution, which is different in comparison to the first filter bank A. In this example, filter bank B has a higher time resolution, and therefore a lower frequency resolution, but it is noted that the opposite could also be possible. The second pass results in a second set of gains 33b.

The third pass, illustrated in FIG. 3c, applies the first and second sets of gains 33a, 33b to the input audio content 12 to produce the mastered audio content 39. Specifically, the first time-frequency analysis is applied at analysis filterbank A 31a to divide the input audio content 12 into a first set of T/F tiles (e.g., dividing the input audio content 12 into time-frequency tiles by time segmentation, time windowing, analysis filter banks or Fourier transforms). Then, the first set of gains 33a is applied in block 37, and synthesis filter bank 35a is applied to form a time-domain signal (referred to as a "first-stage" audio content). Then, the second filter bank 31b, a further gain application block 38 that applies the second set of gains 33b, and a second synthesis filter bank 35b are applied to the first-stage audio content in a similar manner, to finally provide the mastered audio content 39.

Please note that this multi-stage approach fits in the generic structure shown in FIG. 1. The 'attribute analysis' could comprise computing time-frequency energies at different time scales (e.g. using filter banks 31a and 31b). The 'modification' stage could comprise applying gains 33a and 33b according to the scheme depicted in FIG. 3c.

Time-Frequency Histogram Matching

In another embodiment, the distribution across frames rather than the exact values of energy is matched for every frequency band, or at least certain quantiles of the energy distribution are matched. For this purpose, the following processing may be applied:

1. The energy of the rendered presentation is calculated for each time-frequency tile.
2. Subsequently, a distribution (histogram) of energy levels (either expressed in the signal power domain, or in the decibel domain) is computed for each frequency band. This distribution is referred to as the source distribution.
3. The process of step 1) and 2) is repeated for the mastered rendered presentation, to result in a histogram of energy levels in each sub band for the mastered rendered presentation. This distribution is referred to as the target distribution.
4. A transformation function is created such that for every level in the source distribution, a gain is provided. When this gain is applied to the source content, the source energy histogram should closely match the energy histogram of the target.
5. The gains of step 4) are applied to the corresponding time-frequency tile of every audio object or channel or bed in the input audio content to create a mastered audio content.

More details on the transformation function and matching histograms of levels is disclosed in PCT Patent Application PCT/US2019/041457, which is hereby incorporated by reference in its entirety.

Common Mastering Process for Multiple Presentations

Figure 4:
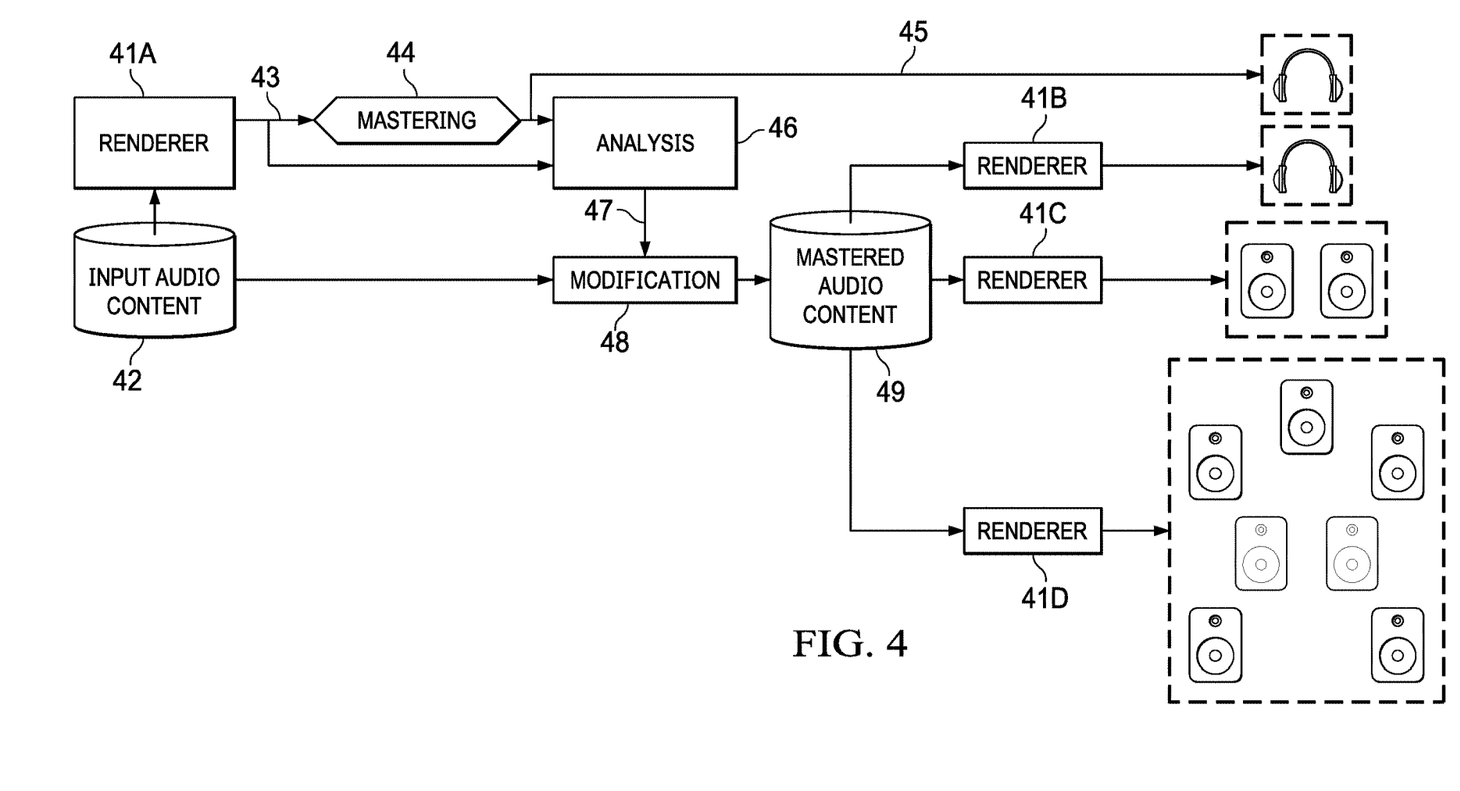
FIG. 4 is a block diagram showing an embodiment in which multiple presentations of the mastered immersive audio asset can be auditioned.

With reference to FIG. 4, the process described in the previous sections can be integrated into a workflow in which the effect of mastering one presentation (for example a binaural headphone presentation) can be auditioned on other presentations as well. In this particular example, the mastering process 44 is applied to a binaural presentation 43 of an input audio content 42 to form a mastered binaural presentation 45. During, or after mastering, the effect of the mastering process 44 can be auditioned on other presentations by employing one or more renderers 41b-d that render the mastered audio content 49 to one or more suitable presentations. In particular, if the analysis 46 and modification 48 of attributes 47 operates in real time with low latency, the mastering engineer can simply switch between the various presentations to audition how the mastering process affects other presentations.

High-Level Attribute Summary and Modification

Figure 5:
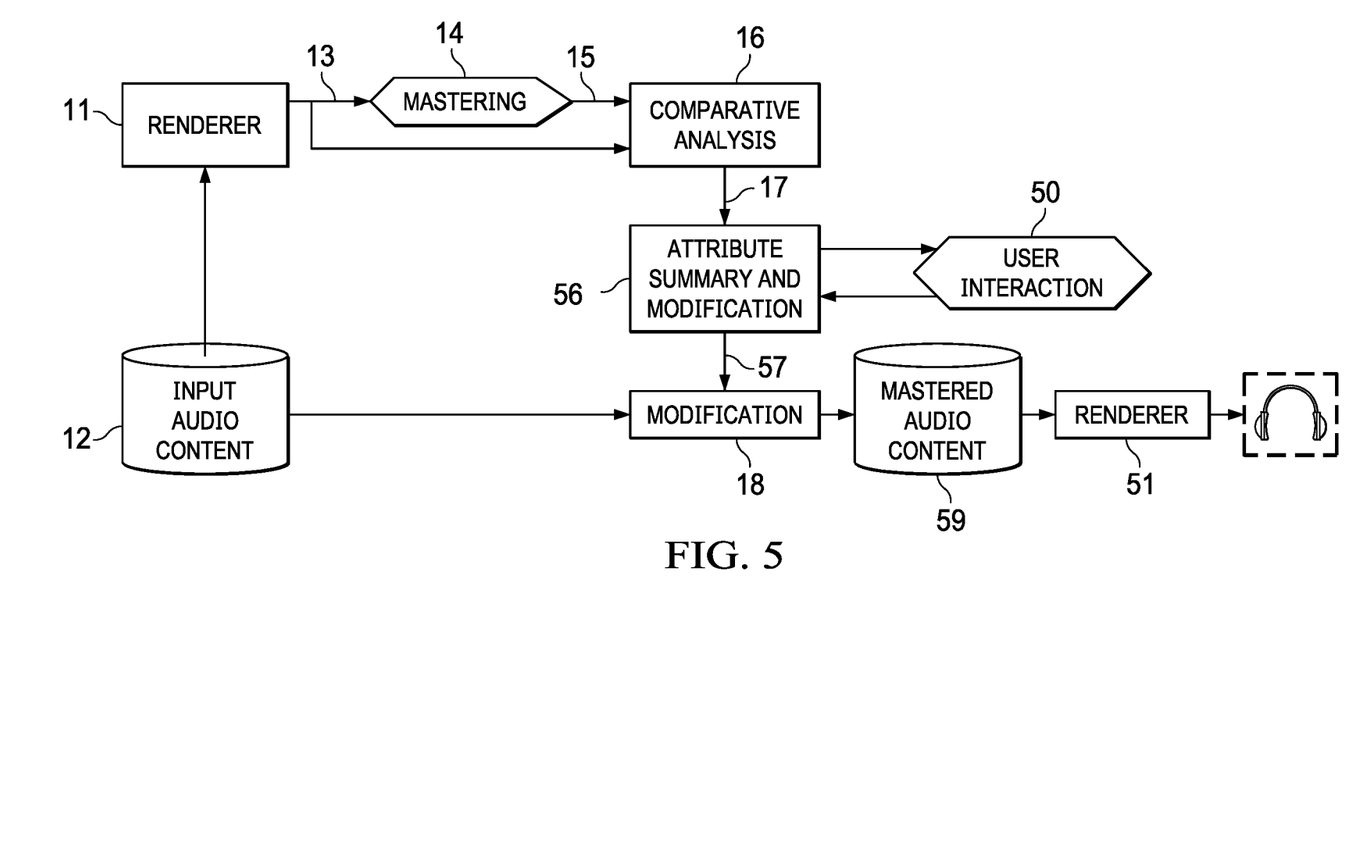
FIG. 5 is a block diagram of an embodiment with attribute summary and attribute modification based on user interaction.

With reference to FIG. 5, a further step can be included in the 'mastering and analysis' whereby the difference in attributes of the rendered presentation and the mastered rendered presentation are summarized and made available for further modification, either automatically or manually, to provide further options for the mastering stage.

For example, the input versus output energy curves in subbands could be extracted from the analysis stage and methods for changing these energy curves could be provided to a user. This could be achieved e.g. by allowing the user to provide a (static) offset curve, and then apply this (static) offset curve when the energy between input audio content and mastered audio content is computed. Such a curve may increase the energy level across selected frequencies. Alternatively, a distribution for the original input audio content and the mastered audio content may be determined, and then matched in a 'mastering' step, where the user can modify the mastered content distribution, for example by moving the various quantile curves closer together or further apart to in effect apply compression or expansion. This more dynamic approach is described in more detail in WO20014517, hereby incorporated by reference.

In FIG. 5, elements corresponding to elements in FIG. 1 have been given identical reference numerals. The attributes 17 resulting from the attribute analysis stage 16 are here summarized and provided to a user, for example the mastering engineer, in an interaction process 50. In some embodiments, the attributes 17 may be modified by the user in an attribute modification block 56 to generate modified attributes 57, which can subsequently be used to create the mastered audio content 59. Again, this mastered audio content 59 may be rendered by a renderer 51 into any desired presentation.

Efficient Auditioning of the Mastering Process

Figure 6:
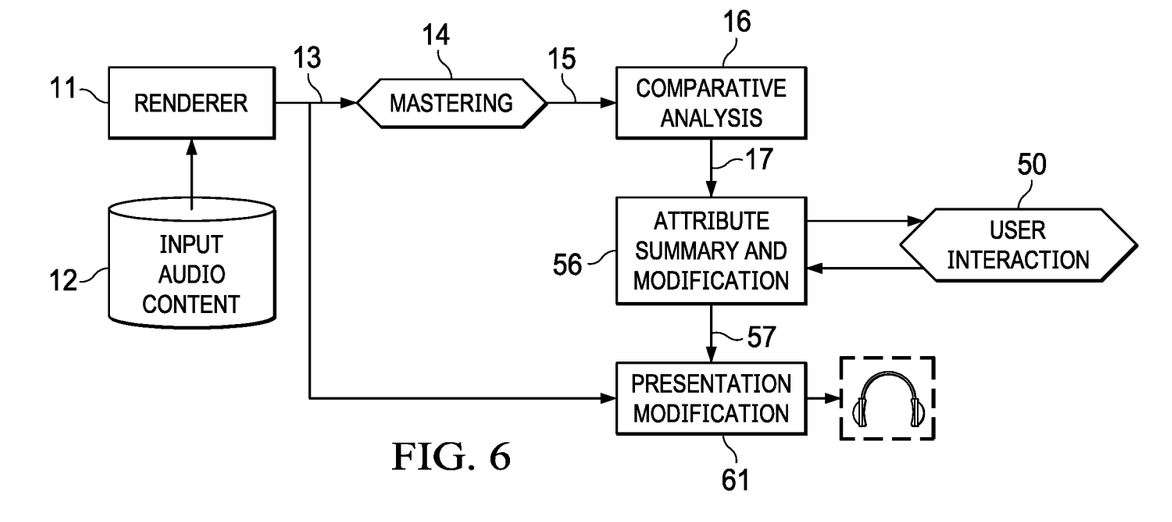
FIG. 6 is a block diagram of an auditioning embodiment.

In the previous embodiment, auditioning the mastered audio content required one or more renderers. In some scenarios, running a renderer can be too costly in terms of processing and battery resources. In that case, one can simulate the output of the renderer rendering the mastered audio content by applying the attributes to the renderer output (prior to the mastering stage). This way, the effect of mastering the input audio content can be auditioned with only one renderer stage as depicted in FIG. 6. This process is particularly helpful when the mastering process itself is being tuned and adjusted, for example the adjustment of parameters of the algorithms used in the mastering stage. As soon as all parameters for the mastering process are tuned, a mastered audio content can be generated in line with the embodiments given in the previous sections.

Implementation

Systems and methods disclosed in the present application may be implemented as software, firmware, hardware or a combination thereof. In a hardware implementation, the division of tasks does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

More specifically, the invention may be implemented in various ways.

According to one embodiment, the invention is implemented as an off-line process running on a processor, in which the processor receives the input audio content, the rendered presentation, and a mastered rendered presentation as input. For example, the processor can be configured to perform the functions of the analysis module 16 and the modification module 18 in FIGS. 1 and 2, and provide the mastered audio content as a result. This processing can take place either locally or within the cloud.

Also, the three-stage process described with reference to FIGS. 3a-c may be implemented in such an off-line process.

According to another embodiment, the invention is implemented as a real-time process, for example within a digital audio workstation (DAW), in which for example also the renderer 11 and mastering process 14 in FIGS. 1 and 2 can be implemented and run in real time.

In such a real-time process may also implement the user interaction 50 and attribute modification 56 in FIGS. 5 and 6. Such a process enables real-time auditioning of a mastering process on one or more playback presentations.

Generalizations

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described specific embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention. Further, the input audio content and the rendered presentations may have different formats than those used in the examples. Also, other means than filter banks may be used to divide signals into time-frequency tiles.

The invention claimed is:

1. A method for generating mastered audio content, the method comprising:
   providing an input audio content comprising a number, M1, of audio signals;
   providing rendered presentation of said input audio content, said rendered presentation comprising a number, M2, of audio signals;
   providing a mastered presentation generated by mastering said rendered presentation;
   comparing the mastered presentation with the rendered presentation to determine, for each time-frequency tile, a difference in an attribute between the mastered presentation and the rendered presentation; and
   modifying the audio signals of the input audio content by superimposing the difference in the attribute on each corresponding time-frequency tile of each audio signal to generate the mastered audio content.

2. The method according to claim 1, wherein the rendering involves a reduction of the number of audio signals such that M1>M2.

3. The method according to claim 2, wherein the rendered presentation is a stereo presentation.

4. The method according to claim 2, wherein the input audio content is a multi-channel content, such as 5.1 or 7.1.

5. The method according to claim 1, wherein the input audio content includes 3D audio information.

6. The method according to claim 5, wherein the input audio content includes at least one audio object, each audio object including an audio signal associated with a spatial location, and the rendered presentation includes a time-varying rendering of said at least one audio object.

7. The method of claim 1, where the differences in an attribute between the mastered presentation and the rendered presentation are determined independently for different audio signals or sets of audio signals in the rendered presentation, and one or more of the audio signals of the input audio content is modified according to the audio signal(s) of the rendered presentation to which it contributes.

8. The method of claim 1, further including the step of applying a mastering process to the rendered presentation, using one or more processors that implement one or more of: a compressor, a multi-band compressor, an equalizer, a dynamic equalizer, a peak limiter, and a non-linear processing device, wherein the one or more processors may be analogue, digital or a combination of both.

9. The method of claim 8, further including the step of applying an automatic mastering algorithm to the down-mix presentation.

10. The method of claim 1, in which the various steps run at least partially in a digital audio workstation (DAW).

11. The of claim 1, wherein the input audio content, the rendered presentation and the mastered presentation are uploaded into a cloud-based service, and wherein the steps of comparing and modifying are performed by said cloud-based service.

12. The method of claim 1, in which the attribute represents energy levels in time-frequency tiles of the mastered presentation and the rendered presentation, and wherein said modification equalizes energy in each time-frequency tile of the signals of the input audio content.

13. The method of claim 12, in which said modification equalizes a distribution property of energy in each time-frequency tile of the signals of the input audio content, said distribution property being a mean, median, variance, quantile, or any higher-order moment of a distribution.

14. The method of claim 12,
   wherein the step of comparing includes:
      determining a first set of gains representing ratios of energy levels in corresponding time-frequency tiles of the mastered presentation and the rendered presentation, said time-frequency tiles having a first relationship between time and frequency resolution,
      applying said first set of gains to the corresponding time-frequency tiles of the rendered presentation, to form an intermediate presentation,
      determining a second set of gains representing ratios of energy levels in corresponding time-frequency tiles of the mastered presentation and the intermediate presentation, said time-frequency tiles having a second relationship between time and frequency resolution, and
   wherein the step of modifying the input audio content includes:
      applying said first set of gains to time-frequency tiles of the input audio content, said time-frequency tiles having said first relationship between time and frequency resolution, to form a first-stage audio content, and applying said second set of gains to time-frequency tiles of the first-stage audio content, said time-frequency tiles having said second relationship between time and frequency resolution, to form said mastered audio content.

15. The method according to claim 12, wherein:

an energy level $\sigma_{n,b}^2$ of a time-frequency tile of a signal $x_{n,b,c}[k]$ n, where n is a time segment index, b is a frequency band index, c is a channel-index and k is a sample index, is computed according to:

$$\sigma_{n,b}^2 = \Sigma_c \Sigma_k x^2_{n,b,c}[k],$$

and wherein the step of modifying the input audio content includes applying a tile specific gain which represents a ratio between energy levels of the corresponding tile in the mastered presentation and the rendered presentation, respectively.

16. A computer implemented system for generating mastered audio content, the system comprising:

an analysis module configured to:
receive a rendered presentation comprising a number, M2, of audio signals and a mastered presentation generated by mastering said rendered presentation, and compare the mastered presentation with the rendered presentation to determine, for each time-frequency tile, a difference in an attribute between the mastered presentation and the rendered presentation; and a modification module configured to:
receive said indications of differences and an input audio content comprising a number, M1, of audio signals, and modify one or more of the audio signals of the input audio content by superimposing the difference in the attribute on each corresponding time-frequency tile of the input audio content to generate the mastered audio content.

17. The system according to claim 16, wherein the analysis module and the modification module are implemented in an off-line processor.

18. The system according to claim 16, further comprising:
a renderer configured to receive the input audio content and provide the rendered presentation; and
a mastering module configured to enable mastering of the rendered presentation.

19. The system according to claim 18, wherein the mastering module provides an automated mastering process.

20. The system according to claim 18, wherein the mastering module includes one or more of: a compressor, a multi-band compressor, an equalizer, a dynamic equalizer, a peak limiter, and a non-linear processing device.

* * * * *

UNITED STATES PATENT AND TRADEMARK OFFICE
CERTIFICATE OF CORRECTION

PATENT NO. : 12,069,464 B2
APPLICATION NO. : 17/625720
DATED : August 20, 2024
INVENTOR(S) : Dirk Jeroen Breebaart et al.

It is certified that error appears in the above-identified patent and that said Letters Patent is hereby corrected as shown below:

In the Claims

Column 12, Line 34, in Claim 11, after "The", insert --method--

Signed and Sealed this
Twelfth Day of November, 2024

*Katherine Kelly Vidal*

Katherine Kelly Vidal
*Director of the United States Patent and Trademark Office*